G. R. MUSSER.
EGG BEATER GUARD.
APPLICATION FILED JULY 13, 1917.

1,275,587.

Patented Aug. 13, 1918.

WITNESSES
Ernest H. Crocker
L. B. Middleton

INVENTOR
George R. Musser
BY Richard B. Owen.
ATTORNEY

UNITED STATES PATENT OFFICE.

GEORGE R. MUSSER, OF KINGMAN, ARIZONA.

EGG-BEATER GUARD.

1,275,587.　　　　Specification of Letters Patent.　　Patented Aug. 13, 1918.

Application filed July 13, 1917. Serial No. 180,387.

*To all whom it may concern:*

Be it known that I, GEORGE R. MUSSER, a citizen of the United States, residing at Kingman, in the county of Mohave and State of Arizona, have invented certain new and useful Improvements in Egg-Beater Guards, of which the following is a specification.

My invention relates to new and useful improvements in kitchen utensils, and the principal object of the invention is to provide a guard for egg beaters to prevent the beater from coming in contact with the dish containing the eggs, while in operation.

Another object of the invention is to provide means for engaging the lower part of the beater by holding the same against movement in the dish and in proper position in relation to the guard.

A further object of the invention is to provide a loop of wire to inclose the beater and a member having its ends bent upwardly and engaged with the loop to hold the same a distance above the bottom of the dish.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which.

Figure 1:
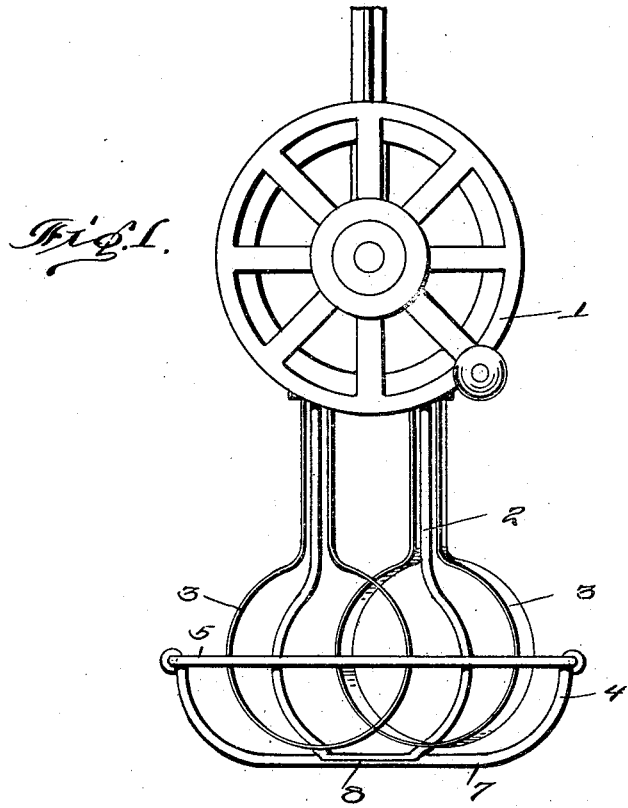
Figure 1 is a view showing the guard in position around the beater.
Figure 2:
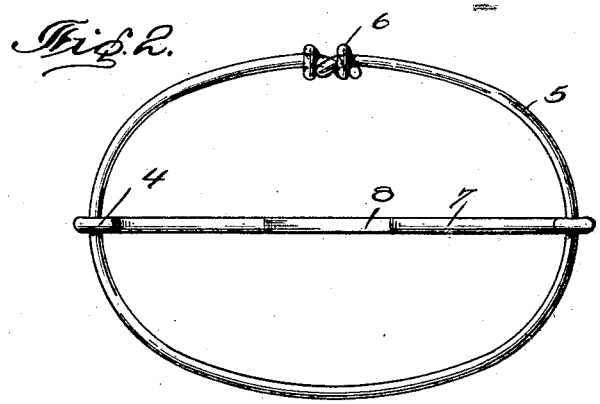
Fig. 2 is a plan view of the guard.

In these figures 1 represents the egg beater comprising the supporting member 2 which supports the two beaters 3. 4 represents the guard which consists of the member 5, preferably made of wire, bent into oval shape and having its ends twisted together as shown at 6. 7 represents the supporting member, also preferably made of wire bent into dish shape and having its ends curved around the ends of the member 5. The supporting member is located centrally in relation to the member 5 and supports the same at a distance from the lowermost part of said member 7. Said member 7 is provided with a cut out part forming a seat 8 for supporting the member 2 of the beater and said seat is located centrally of said member 7.

In using the device it is placed in the dish in which the eggs are to be beaten and the egg beater is placed therein with its lowermost part engaging the seat 8. The member 5 is made of such a size that it will allow free turning movement of the beaters. It will thus be seen that the egg beater is held against movement on the device and said device will prevent the beaters from contacting with the sides of the dish. The guard will permit the beater to be moved about in the dish.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. A supporting device for egg beaters, comprising a loop for surrounding the beaters and a supporting member for the loop and for said beaters.

2. A device of the class described comprising a loop of wire, a supporting member made of wire and having its ends curving upwardly and outwardly and engaging said loop, said supporting member having a cut out part forming a seat for the egg beater.

3. A device of the class described comprising, a pair of egg beaters, a support for said beaters, a wire guard surrounding said beaters, a supporting member made of wire and having its ends curved upwardly and outwardly to engage the guard member centrally thereof, and said supporting member having a cut out part forming a seat for the egg beaters.

4. A supporting device for egg beaters comprising, a loop for surrounding the beaters, and a supporting member for the loop having a seat thereon for the egg beaters.

In testimony whereof I affix my signature in presence of two witnesses.

GEORGE R. MUSSER.

Witnesses:
 GEO M. MORTON,
 L. M. TEALE.